(12) United States Patent
Zubaydi et al.

(10) Patent No.: US 12,474,972 B2
(45) Date of Patent: Nov. 18, 2025

(54) SYSTEMS AND METHODS FOR APPORTIONING CLOUD-BASED RESOURCES BASED ON REAL-TIME CLOUD-BASED DATABASE ENGINE TRAFFIC PATTERNS

(71) Applicant: Capital One Services, LLC, McLean, VA (US)

(72) Inventors: Anmar Zubaydi, Henrico, VA (US);
Erik Tate, Richmond, VA (US);
Thomas Powers, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 613 days.

(21) Appl. No.: 17/820,551

(22) Filed: Aug. 17, 2022

(65) Prior Publication Data

US 2024/0061722 A1    Feb. 22, 2024

(51) Int. Cl.
*G06F 9/50* (2006.01)
*H04L 61/4511* (2022.01)

(52) U.S. Cl.
CPC .......... *G06F 9/5083* (2013.01); *G06F 9/5077* (2013.01); *H04L 61/4511* (2022.05); *G06F 2209/508* (2013.01)

(58) Field of Classification Search
CPC ................ G06F 9/5083; G06F 9/5077; G06F 2209/508; G06F 16/27; H04L 61/4511
See application file for complete search history.

(56) References Cited

U.S. PATENT DOCUMENTS

| | | | |
|---|---|---|---|
| 11,941,454 B1 * | 3/2024 | Gupta | G06F 9/45533 |
| 2023/0214306 A1 * | 7/2023 | Ye | G06F 11/3414 |
| | | | 707/609 |

* cited by examiner

*Primary Examiner* — Sisley N Kim
(74) *Attorney, Agent, or Firm* — Foley & Lardner LLP (57) ABSTRACT

Systems and methods for apportioning cloud-based resources through the use of domain name services based on real-time cloud-based database engine traffic patterns. For example, the system may monitor incoming cloud-based database engine traffic over a plurality of disparate computer network resources. The system may generate a first recommendation for domain name service based on the first difference, wherein the first recommendation requests a modification of an allocation of the plurality of disparate computer network resources.

18 Claims, 5 Drawing Sheets

SYSTEMS AND METHODS FOR APPORTIONING CLOUD-BASED RESOURCES BASED ON REAL-TIME CLOUD-BASED DATABASE ENGINE TRAFFIC PATTERNS

BACKGROUND

Cloud computing involves the use of allocating computing resources such as storage, processing power, databases, networking, analytics, artificial intelligence, and software applications over the Internet (i.e., the cloud). The use of cloud computing and cloud-based resources has exploded recently. Along with this explosion in use, is the need to effectively manage these resources.

SUMMARY

In view of the foregoing, methods and systems for apportioning cloud-based resources based on real-time cloud-based database engine traffic patterns are described. For example, one of the benefits of cloud-based resources is the ability to apportion them in real-time. That is, as database engine traffic increases or decreases, additional resources may be allocated to meet the demand.

However, while additional resources may be allocated to meet the demand, there exist two technical challenges that must be overcome. First, conventional cloud-based database engines rely on the use of read replicas to serve high-volume application read traffic from multiple copies of the initial data, thereby increasing aggregate read throughput. That is, as more traffic is created (e.g., more connections to the cloud-based resources required), the conventional systems service these connections using read replicas. The read replica acts as a snapshot of a source database instance. Each of these replicas may then act as a new resource. The problem that is then created through the use of these read replicas is that the usage of different replicas (e.g., the number of connections to a given replica) may become unbalanced, resulting in inefficient resource allocation and/ or bottlenecks. To overcome this imbalance, conventional systems may attempt load balancing across the various resources. However, any attempt at load balancing (e.g., redirect how different resources are allocated) invariably results in a nontrivial amount of downtime. To minimize this first technical challenge, the methods and systems use a novel and unconventional methodology for allocating and/or scaling resources, namely relying on a domain name service to implement reallocations of resources.

Despite the use domain name service to implement reallocations of resources and thus eliminate downtime, the methods and systems must still overcome another technical problem faced by conventional systems. Namely, real-time cloud-based database engine traffic patterns are notoriously unpredictable. For example, spikes in usage (e.g., usually represented by a usage threshold being met) may occur in dramatic fashion with little or no warning. A conventional approach to such a spike is to reactively address an increase through the allocation of additional resources. However, a reactive approach creates inherent delays. These inherent delays are compounded as more additional resources are requested. As such, the methods and systems use a proactive approach to determine when to allocate additional resources.

The proactive approach is highlighted by the use a model that determines a dynamic threshold. Notably, the dynamic threshold is not based on a static usage rate or connection percentage, but instead is based on a rate at which additional resources are requested. For example, the system may generate a record of the number of instances (e.g., over a given time period) at which a given criterion (e.g., a usage amount, connection percentage, etc.) was met, the system then compares this record to the dynamic threshold to determine when to allocate additional resources (e.g., using the domain name service). By using a comparison of the record indicating a number of times (or rate) at which a criterion was met, as opposed to raw usage and connection percentages, the system introduces a proactive approach to apportioning cloud-based resources that is not present in conventional systems.

Additionally, the system may maintain records from numerous resources (e.g., for each read replica). The system may compare each record to the same or different criterion, but may nonetheless create a composite number of instances. The composite number of instances may then be compared to a composite dynamic threshold number to determine whether a modification of a current allocation is needed. By doing so, not only does the amount of resources scale with the need of a data owner, but the methodology to determine whether or not additional resources are needed scales as well (and in a proactive manner).

In some aspects, systems and methods for apportioning cloud-based resources through the use of domain name services based on real-time cloud-based database engine traffic patterns are described. For example, the system may monitor incoming cloud-based database engine traffic over a plurality of disparate computer network resources. The system may determine that a first resource of the plurality of disparate computer network resources that is processing the cloud-based database engine traffic corresponds to a first criterion. The system may generate a first record corresponding to the first resource, wherein the first record comprises a first plurality of instances, and wherein each instance of the first plurality of instances corresponds to a respective instance where the first criterion was met. The system may determine a first number of instances in the first plurality of instances. The system may determine, using a model, a first dynamic threshold number, wherein the first dynamic threshold number corresponds to the first criterion, wherein the model is trained to determine dynamic threshold numbers corresponding to criteria based on historical data patterns. The system may determine a first difference between the first number of instances in the first plurality of instances and the first dynamic threshold number. The system may generate a first recommendation for domain name service based on the first difference, wherein the first recommendation requests a modification of an allocation of the plurality of disparate computer network resources.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
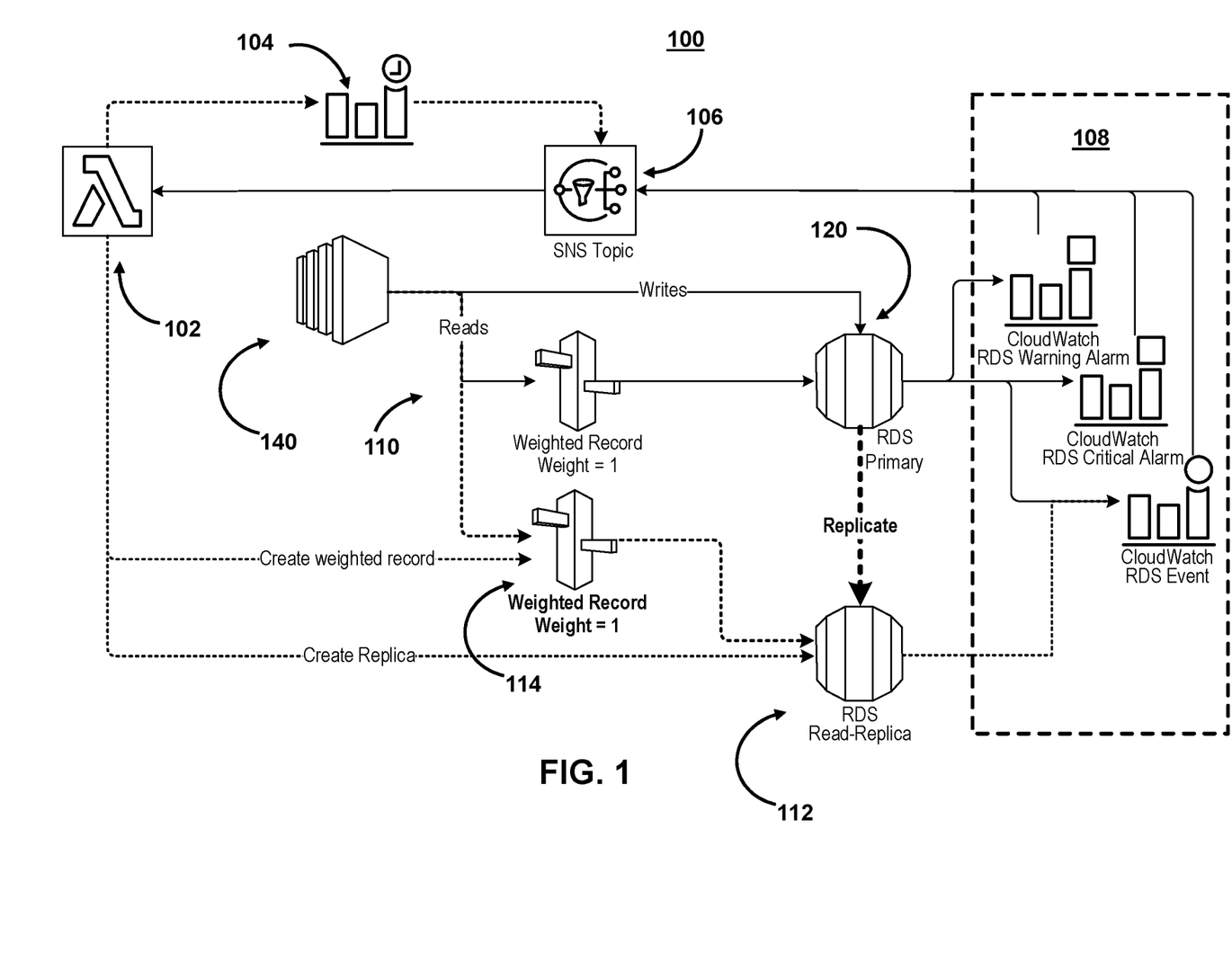
FIG. 1 shows an illustrative system architecture for apportioning cloud-based resources, in accordance with one or more embodiments.

FIG. 1 shows an illustrative system architecture for apportioning cloud-based resources, in accordance with one or more embodiments. As described herein, methods and systems for apportioning cloud-based resources based on real-time cloud-based database engine traffic patterns are described. For example, the system may provide an autoscaling feature on existing infrastructure that involves an existing cloud resource (e.g., resource 120). Notably, the autoscaling system results in zero downtime when the system reads from a database via a domain name system (DNS) web service (e.g., DNS 140).

For example, diagram 100 illustrates a process by which one or more recommendations may be generated based on a notification (e.g., a warning alarm). For example, component 102 may comprise a cloud-based resource, which in some embodiments, may be a serverless, event-driven compute service that allows data owners to run code for an application or back-end service without a provisioning or managing server. Component 102 may act as an orchestration layer. Component 102 may be configured to create one or more alerts (e.g., time-based alert 104) that may be transmitted to access point 106. For example, access point 106 may be a logical access point that acts as a communication channel. Access point 106 may receive one or more event rule triggers which may be activated periodically (e.g., every 30 minutes).

The system may trigger one or more notifications (e.g., alarms) based on certain criteria. That is, the system may determine that a first resource of the plurality of disparate computer network resources that is processing the cloud-based database engine traffic corresponds to a first criterion. For example, the criteria may correspond to a current usage of cloud resources allocated to a given data owner (e.g., one or more cloud databases and/or other resources). In response to detecting a current usage, the system may generate a recommendation that is used to trigger component 102. For example, the system may trigger one or more of states 108. States 108 may correspond to various dynamic thresholds being read and/or may result in various functions being performed. For example, a first criteria may be based on a percentage of total connections for current resources. In such cases, a criterion may be met, for example, when a database metric reaches a connection count of 30% of total connections. Another state may correspond to when another threshold may be met (e.g., a connection count of 70% of total connections).

For example, states 108 may be used to trigger the component 102 via access point 106 to orchestrate provisioning a new read replica 110 and route traffic to the new replica by creating a weighted record and modifying the existing record as shown in FIG. 1.

Figure 2:
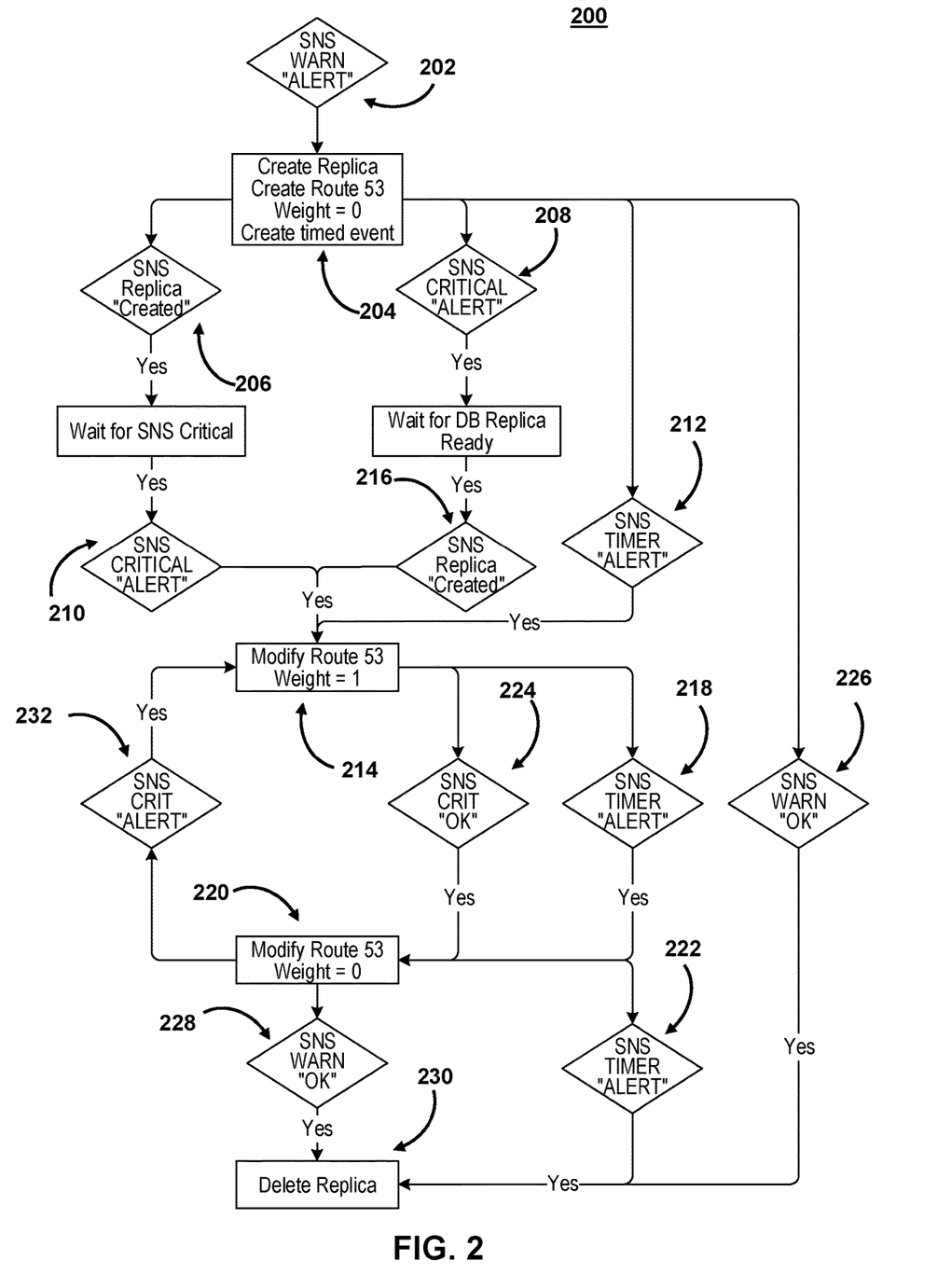
FIG. 2 shows a flowchart of the steps involved in apportioning cloud-based resources, in accordance with one or more embodiments.

FIG. 2 shows a flowchart of the steps involved in apportioning cloud-based resources, in accordance with one or more embodiments. For example, process 200 indicates a result of a recommendation to modify the allocation of one or more resources. The system may determine whether or not given states (e.g., "OK," "ALERT," or "CRITICAL") have been triggered. The system may further execute process 200 through the transmission of Simple Notification Service (SNS) messages. For example, at step 202, the system may have detected that a dynamic threshold (or threshold number) was met. In response, the system may at step 204 request an additional resource (e.g., a read replica). The system may then create an additional resource (e.g., at step 206 or step 216) and/or await another dynamic threshold to be met (e.g., at step 208, step 210, and/or step 232). The system may use a given time period to determine whether another dynamic threshold is met (e.g., at step 212, step 218, and/or step 222).

If another dynamic threshold is met and/or another resource is allocated, the system may modify a weight corresponding to a resource to direct requests to that resource at step 214 (or step 220). For example, the system may apportion additional resources through the use of a DNS to use weighted record sets to distribute requests across multiple resources. Within a hosted zone, the system may create individual record sets for each DNS endpoint associated with a given replica and give them the same weight, then, direct requests to the endpoint of the record set. The system may then adjust the weights to route traffic to different resources (e.g., as step 214 and/or step 220). Upon determining that a baseline state (e.g., "OK") has been reached (e.g., at step 224, step 226, and/or step 228), the system may delete the additional resource at step 230.

Figure 3:
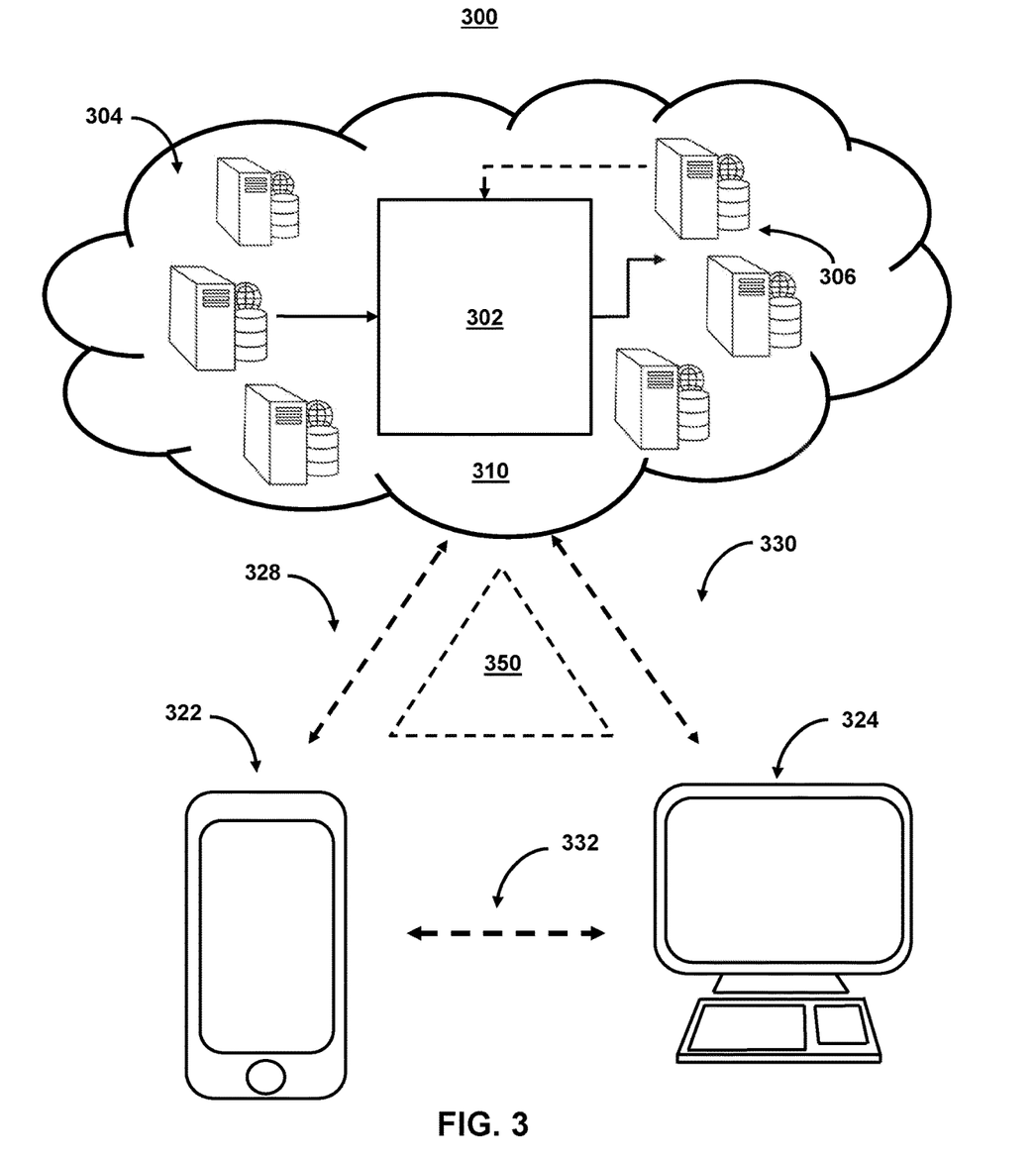
FIG. 3 shows illustrative system components for apportioning cloud-based resources, in accordance with one or more embodiments.

FIG. 3 shows illustrative system components for apportioning cloud-based resources, in accordance with one or more embodiments. For example, the system may represent the components used for apportioning cloud-based resources, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, or other computer equipment (e.g., a server), including "smart," wireless, wearable, and/or mobile devices. FIG. 3 also includes cloud resources 310. Cloud resources 310 may alternatively be any computing device as described above and may include any type of mobile terminal, fixed terminal, or other device. For example, cloud resources 310 may be implemented as a cloud computing system and may feature one or more component devices. For example, cloud resources 310 may house and/or enable system 100 (FIG. 1).

It should also be noted that system 300 is not limited to three devices. Users may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud resources 310. In some embodiments, the various computers and systems described herein may include one or more computing devices that are programmed to perform the described functions. Additionally, or alternatively, multiple users may interact with system 300 and/or one or more components of system 300.

With respect to the components of mobile device 322, user terminal 324, and cloud resources 310, each of these devices may receive content and data via input/output (I/O) paths. Each of these devices may also include processors and/or control circuitry to send and receive commands, requests, and other data using the I/O paths. For example, system 300 may include input/output circuitry configured to generate for display, on a user interface, the recommendation based on the first difference.

The control circuitry may comprise any processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., additional resource allocations, detected issues, recommendations, queries, and/or notifications). For example, system 300 may include: control circuitry configured to monitor incoming cloud-based database engine traffic over a plurality of disparate computer network resources, wherein the cloud-based database engine traffic of non-native data corresponds to a plurality of data owners; determine a first resource processing the cloud-based database engine traffic corresponds to a first data owner; generate a first record corresponding to the first resource, wherein the first record comprises a first plurality of instances, and wherein each instance of the first plurality of instances corresponds to a respective instance where the first criterion was met; determine a second resource processing the cloud-based database engine traffic corresponds to a second data owner; generate a second record corresponding to the second resource, wherein the second record comprises a second plurality of instances, and wherein each instance of the second plurality of instances corresponds to a respective data entry in the second resource; determine a number of instances in the first plurality of instances; determine a number of the second plurality of instances, determining, using a model, a first dynamic threshold, wherein the first dynamic threshold corresponds to the first data owner; determine a first difference between the number of instances in the first plurality of instances and the first dynamic threshold; determine, using the model, a second dynamic threshold, wherein the second dynamic threshold corresponds to the second data owner; determine a second difference between the number of the second plurality of instances and the second dynamic threshold, and/or determine to generate a recommendation based on the first difference and to not generate the recommendation based on the second difference.

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another program). The application may cause the processors and/or control circuitry to perform operations related to monitoring for data quality issues and/or generating additional resource, detected issues, recommendations, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connected to the servers or client devices via, for example, a port (e.g., a USB port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein. For example, system 300 may include storage circuitry configured to store a model, wherein the model is trained to determine a dynamic threshold number corresponding to criteria based on historical data patterns.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud resources 310 may be structured according to one or more service-oriented architecture models. For example, cloud resources 310 may be designed to provide easy, scalable access to applications, resources, and services, and are designed to fully manage cloud services providers. In particular, cloud resources 310 may dynamically scale to meet the needs of client devices. In some embodiments, the cloud resources 310 may supply some or all cloud resources (e.g., hardware and software necessary for all or some of the operation of one or more cloud services) to cloud services recipient. The cloud services provider may provide cloud services such as online data storage and backup solutions, web-based e-mail services, hosted office suites and document collaboration services, database processing, managed technical support services, and/or general computer power and data processing. In some embodiments, the cloud resource may be a network, server, storage device, application, and/or service. Notably, cloud service models may use a multitude of different formats each with their own benefits and weaknesses to both the cloud services provider and the cloud services recipient. In most models, these benefits and weaknesses are balanced based on the needs and/or business goals of the cloud services provider and the cloud services recipient. However, through the sharing of estimated and actual usage data of cloud services recipients and the cloud services provider, including the information on application usage in that data, the cloud services provider and the cloud services recipient may better balance these weaknesses and benefits. In particular, this balance allows the cloud services provider and the cloud services recipient to switch from one model to another and/or deviate from traditional model formats. These deviations can be accomplished through the apportionment methods described below. For example, by analyzing information included in the shared data (e.g., information about one or more applications that use the cloud resources), the cloud services provider may categorize the applications and/or the functions of those applications into authorized and unauthorized uses, the determination of which is used to further efficiently apportion the cloud services resources.

For example, cloud resources 310 may be structured according to an infrastructure as a service (IaaS) model in which online services that provide high-level APIs ("Application Programming Interface") used to dereference various low-level details of underlying network infrastructure like physical computing resources, location, data partitioning, scaling, security, backup, etc. In such embodiments, a hypervisor runs the virtual machines as guests, and pools of hypervisors within the cloud operational system can support large numbers of virtual machines and the ability to scale services up and down according to the end users varying requirements. In such embodiments, the client device may deploy and run arbitrary software, which can include operating systems and applications. While the client device does not manage or control the underlying cloud infrastructure, it may have control over operating systems, storage, and deployed applications. IaaS-cloud providers supply these resources on-demand from their large pools of equipment installed in data centers. For wide-area connectivity, customers can use either the Internet or carrier clouds (dedicated virtual private networks). To deploy their applications, cloud users install operating-system images and their application software on the cloud infrastructure. In this model, the end user patches and maintains the operating systems and the application software, and the end user has access to virtual machines, servers, storage, load balances, etc.

Cloud resources 310 may also be structured as a platform as a service (PaaS) model. In such embodiments, cloud resources 310 deploys onto the cloud infrastructure consumer-created or acquired applications created using programming languages, libraries, services, and tools supported by the cloud services provider. The end user does not manage or control the underlying cloud infrastructure including network, servers, operating systems, or storage, but has control over the deployed applications and possibly configuration settings for the application-hosting environment. In this model, the end users do not manage or control the underlying cloud infrastructure including network, servers, operating systems, or storage, but have control over the deployed applications and possibly configuration settings for the application-hosting environment, and the end user has access to execution runtime code, databases, web servers, development tools, etc.

Cloud resources 310 may also be structured as a software as a service (SaaS) model. In such embodiments, cloud resources 310 allows the end users to use the cloud services provider's applications running on a cloud infrastructure. The applications are accessible from various client devices through either a thin client interface, such as a web browser (e.g., web-based email), or a program interface. The end user does not manage or control the underlying cloud infrastructure including network, servers, operating systems, storage, or even individual application capabilities, with the possible exception of limited user-specific application configuration settings.

Depending on the model or models used by the cloud services provider the manner in which cloud services are apportioned may change. For example, in a PaaS model, in order to apportion the cloud service resources, the cloud resources 310 may install one or more applications of the first cloud services recipient onto the hardware of a cloud services provider. In another example, in a SaaS model, in order to apportion the cloud service resources, cloud resources 310 may set one or more limits for input/output operations per second for one or more applications of the first cloud services recipient.

It should be noted that in some embodiments, the cloud service may apportion cloud service resources according to those accustomed to other models. For example, as stated below, cloud resources 310 may receive output files which include specific information that allows cloud resources 310 to better predict actual usage of a cloud services recipient, as well as authorized use. Because cloud resources 310 is better able to predict actual and/or authorized use, cloud resources 310 may apportion cloud services using techniques not accustomed to that model. For example, in a SaaS model, cloud resources 310 may install one or more applications of the first cloud services recipient onto the hardware of a cloud services provider. In another example, in a PaaS model, in order to apportion the cloud service resources, cloud resources 310 may set one or more limits for input/output operations per second for one or more applications of the first cloud services recipient.

Cloud resources 310 may be one or more databases configured to allocate one or more additional resources. For example, the database may include additional resource that the system has collected about an allocation, an issue, a data source, a recommendation, a criterion, and/or historical pattern, both actively and passively. For example, the additional resource may describe one or more characteristics of an issue, a data source, a recommendation, a criterion, and/or historical pattern. Alternatively or additionally, the system may act as a clearinghouse for multiple sources of additional resource. Cloud resources 310 may also include control circuitry configured to perform the various operations needed to generate alternative content. For example, the cloud resources 310 may include cloud-based storage circuitry configured to generate alternative content. Cloud resources 310 may also include cloud-based control circuitry configured to run processes to determine allocations. Cloud resources 310 may also include cloud-based input/output circuitry configured to display recommendations.

Cloud resources 310 may include model 302, which may be a machine learning model (e.g., as described in FIG. 3). Model 302 may take inputs 304 and provide outputs 306. The inputs may include multiple datasets, such as a training dataset and a test dataset. Each of the plurality of datasets (e.g., inputs 304) may include data resources related to user data, predicted severities, and/or actual severities. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., corresponding to a notification).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions (e.g., about an allocation, an issue, a data source, a recommendation, a criterion, and/or a historical pattern).

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

System 300 also includes API layer 350. API layer 350 may allow the system to generate recommendations across different devices. In some embodiments, API layer 350 may be implemented on mobile device 322 or user terminal 324. Alternatively or additionally, API layer 350 may reside on one or more of cloud resources 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL ("Web Service Description Language"), that describes the services in terms of its operations and the data types used to exchange information. REST APIs do not typically have this contract; instead, they are documented with client libraries for most common languages, including Ruby, Java, PHP, and JavaScript. SOAP ("Simple object access protocol") Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API platforms and their modules. API layer 350 may use developer portal. API layer 350 may use strong security constraints applying WAF and DDoS protection, and API layer 350 may use RESTful APIs as standard for external integration.

Figure 4:
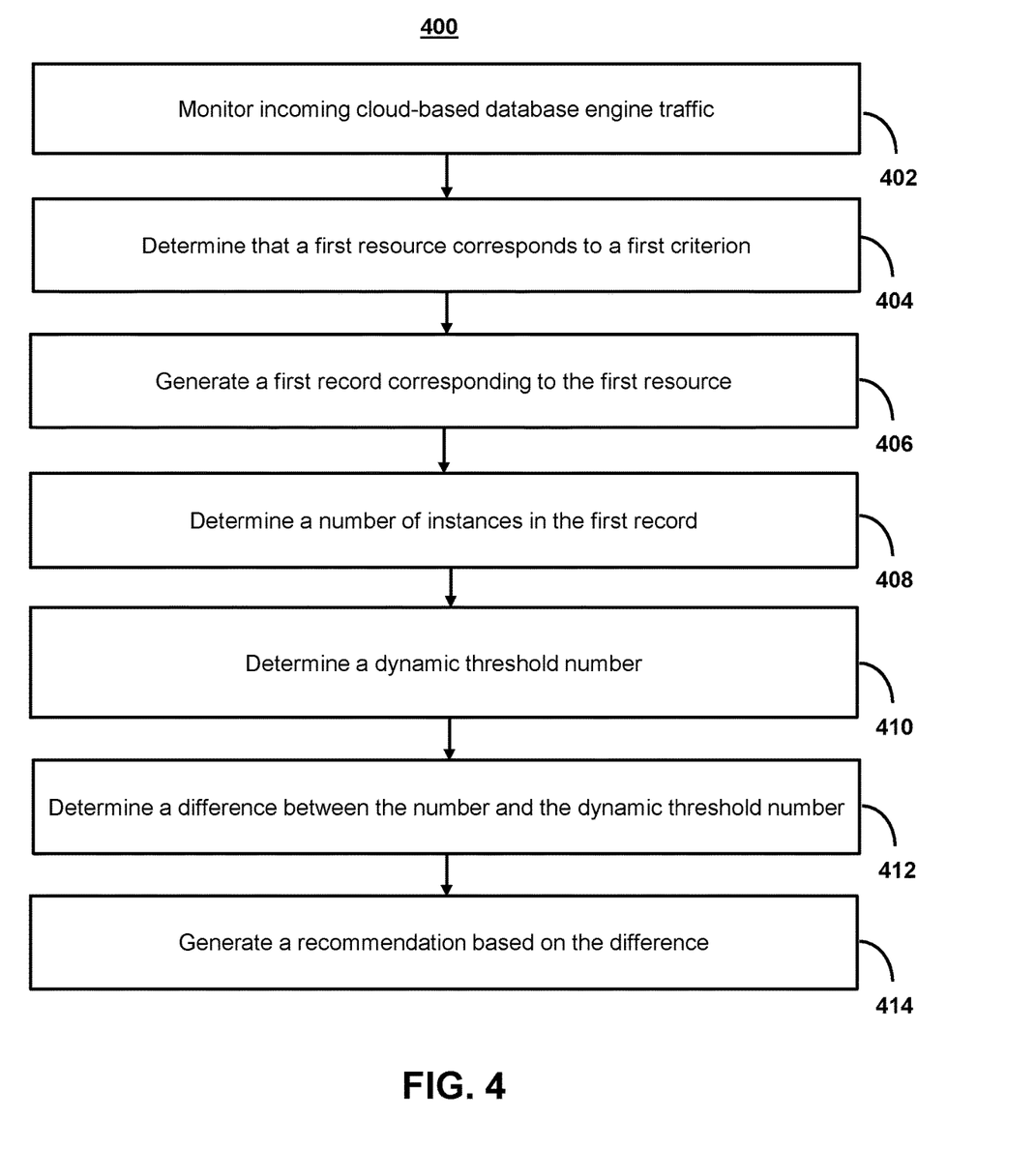
FIG. 4 shows a flowchart of the steps involved in monitoring data quality issues in non-native data over a plurality of disparate computer network resources, in accordance with one or more embodiments.

FIG. 4 shows a flowchart of the steps involved in monitoring data quality issues in non-native data over plurality of disparate computer network resources, in accordance with one or more embodiments. For example, process 400 may represent the steps taken by one or more devices as shown in FIGS. 1-3 when apportioning cloud-based resources.

At step 402, process 400 (e.g., using one or more components in system 300 (FIG. 3)) monitors incoming cloud-based database engine traffic. For example, the system may monitor incoming cloud-based database engine traffic over a plurality of disparate computer network resources. The system may monitor the usage of cloud-based resources to ensure that the cloud-based database engine traffic does not overwhelm the cloud-based resources.

At step 404, process 400 (e.g., using one or more components in system 300 (FIG. 3)) determines that a first resource corresponds to a first criterion. For example, the system may determine that a first resource of the plurality of disparate computer network resources that is processing the cloud-based database engine traffic corresponds to a first criterion (e.g., a criterion based on a threshold for connection percentage, database usage percentage, current network load, and/or current resource utilization).

At step 406, process 400 (e.g., using one or more components in system 300 (FIG. 3)) generates a first record corresponding to the first resource. For example, the system may generate a first record corresponding to the first resource, wherein the first record comprises a first plurality of instances, and wherein each instance of the first plurality of instances corresponds to a respective instance where the first criterion was met. For example, the resources allocated to a data owner have met a threshold for connection percentage, database usage percentage, current network load, and/or current resource utilization.

At step 408, process 400 (e.g., using one or more components in system 300 (FIG. 3)) determines a number of instances in the first record. For example, the system may determine a first number of instances in the first plurality of instances. For example, as described above in FIG. 2, the cloud-based database engine traffic may be populated in a record specific to the criterion. The number of cloud-based database engine traffic may correspond to a number of instances.

At step 410, process 400 (e.g., using one or more components in system 300 (FIG. 3)) determines a dynamic threshold number. For example, the system determines, using a model, a first dynamic threshold number, wherein the first dynamic threshold number corresponds to the first criterion, wherein the model is trained to determine dynamic threshold numbers corresponding to criteria based on historical data patterns. For example, the model may be trained to determine the dynamic threshold number corresponding to criteria based on historical user feedback indicating cloud-based database engine traffic linked to resource usage (e.g., as reported by a user based on additional resource). For example, the criterion may correspond to a given category (or group of categories), such as a merchant that generates cloud-based database engine traffic (e.g., credit card transactions). The system may, therefore, generate a dynamic threshold specific to this merchant and/or the volume of transactions that are received from that merchant on a given day, month, or other time period.

In some embodiments, the model may include a rules engine that applies various rules for interpreting data. The model may use numerous metrics and information (as well as AI/machine learning models as described in relation to FIG. 3) to identify correlations and/or patterns. For example, the model may be trained to determine the dynamic threshold number corresponding to criteria based on historical user feedback indicating cloud-based database engine traffic linked to a resource usage (e.g., as reported by a user based on additional resources). For example, the criterion may correspond to a given category (or group of categories), such as a merchant that generates cloud-based database engine traffic (e.g., credit card transactions). The system may therefore generate a dynamic threshold specific to this merchant and/or the volume of transactions that are received from that merchant on a given day, month, or other time period. The historical information may be indexed by the system such that based on the historical data, the model may automatically identify an expected number of instances to be loaded based on data load patterns in the specified record (e.g., a record corresponding to a given criterion).

In some embodiments, the model may be a tree-based, machine learning model that automatically identifies an expected number of instances for a given record based on historic data entry patterns. Tree-based models are a family of supervised machine learning which performs classification and regression tasks by building a tree-like structure for deciding the target variable class or value according to the features. Tree-based models are particularly beneficial in predicting tabular and spatial datasets.

In some embodiments, the system may determine an average number of cloud-based database engine traffic that is expected to be received based on a criterion (e.g., a merchant, time period, etc.). For example, when determining the first dynamic threshold number, the system may determine an average number of instances in a historical record, wherein the average number of instances is based on historical data corresponding to the first criterion. The average number of instances may correspond to the average number of cloud-based database engine traffic for the first criterion. The system may then determine a probability range based on the average number of instances. For example, the system may generate alerts if a difference between the number of instances in the first plurality of instances and the first dynamic threshold is outside an acceptable range (e.g., a standard deviation from the average).

In some embodiments, the system may monitor for and/or determine a dynamic threshold based on the use of outlier detection. For example, the system may monitor for outliers that may or may not cause a recommendation to be generated. For example, the system may determine one-time volume deviations based on rolling averages of cloud-based database engine traffic over time. The system may then determine whether one or more of the one-time volume deviations are outliers based on parametric analysis. For example, the system may generate a model that assumes that sample data comes from a population that can be adequately modeled by a probability distribution that has a fixed set of parameters. That is, the system may perform a parametric analysis, or a sensitivity analysis, to determine an influence of different geometric or physical parameters or both on the outlier. Additionally or alternatively, the system may determine whether one or more of the one-time volume deviations are outliers based on multivariate outlier detection. For example, the system may detect multivariate outliers with the use of Mahalanobis Distance, which is the distance of a data point from the calculated centroid of the other cases where the centroid is calculated as the intersection of the mean of the variables being assessed.

At step 412, process 400 (e.g., using one or more components in system 300 (FIG. 3)) determines a difference between the number and the dynamic threshold number. For example, the system may determine a first difference between the first number of instances in the first plurality of instances and the first dynamic threshold number. For example, the system may determine if the difference is outside of a probability threshold defined by the dynamic threshold and/or exceeds a proximity from the dynamic threshold. The system may allow a user to predetermine an acceptable difference or range of the dynamic threshold. Furthermore, the difference (along with the dynamic threshold) may vary. That is, the difference may be a dynamic difference that is based on current total volume (e.g., the number of cloud-based database engine traffic for all resources and/or for all criteria). Additionally, the system may receive real-time updates (e.g., from users reviewing additional resource). The system may automatically update the difference and/or dynamic threshold based on the user updates.

At step 414, process 400 (e.g., using one or more components in system 300 (FIG. 3)) generate a first recommendation based on the first difference. For example, the system may generate a first recommendation for domain name service based on the first difference, wherein the first recommendation requests a modification of an allocation of the plurality of disparate computer network resources. In some embodiments, the system may apply a criterion to determine whether or not to generate a recommendation (e.g., trigger a warning and/or request additional resources). For example, the system may determine a degree of deviation of data processing volume based on the difference. The system may select the recommendation from a plurality of recommendations based on the degree of deviation.

It is contemplated that the steps or descriptions in FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
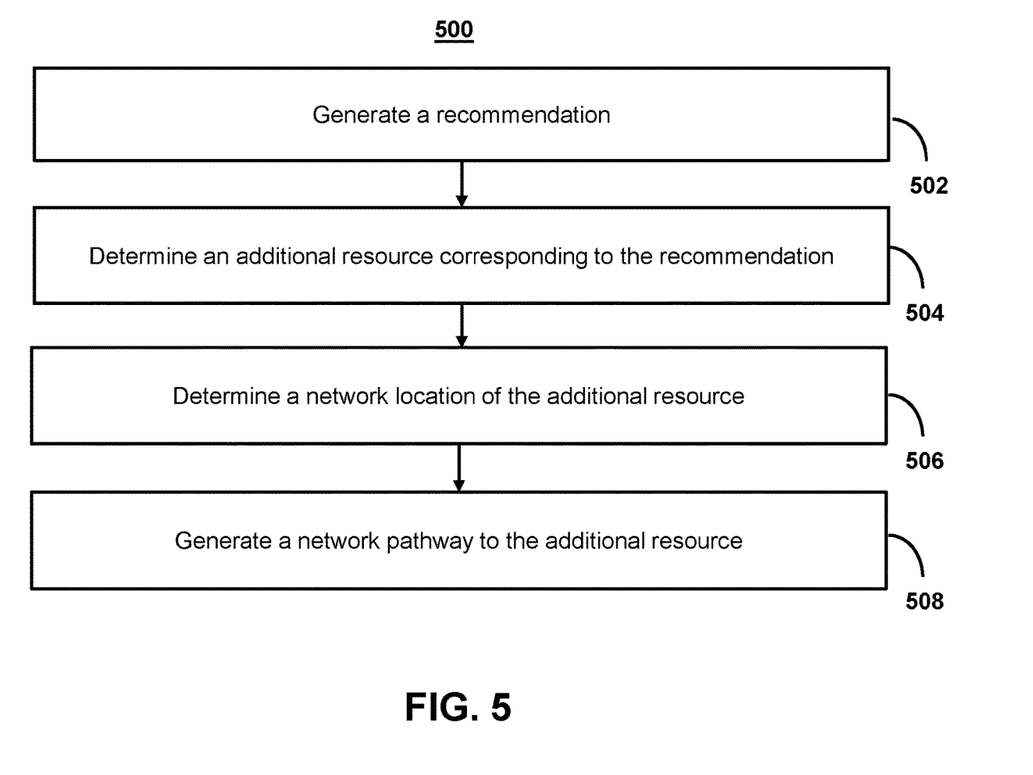
FIG. 5 shows a flowchart of the steps involved in generating additional resources based on apportioning cloud-based resources, in accordance with one or more embodiments.

FIG. 5 shows a flowchart of the steps involved in generating additional resources based on apportioning cloud-based resources, in accordance with one or more embodiments. For example, process 500 may represent the steps taken by one or more devices, as shown in FIGS. 1-3, when generating additional resources. For example, the system may apportion additional resources through the use of a DNS to use weighted record sets to distribute requests across multiple resources. Within a hosted zone, the system may create individual record sets for each DNS endpoint associated with a given replica and give them the same weight, then, direct requests to the endpoint of the record set.

At step 502, process 500 (e.g., using one or more components in system 300 (FIG. 3)) generates a recommendation. For example, the system may, in response to detecting an issue (e.g., a dynamic threshold being met), generate a recommendation for additional resources.

At step 504, process 500 (e.g., using one or more components in system 300 (FIG. 3)) determines additional resources corresponding to the recommendation. For example, the system may determine additional resources corresponding to the recommendation such as one or more of cloud components 310 (FIG. 3). For example, the system may direct requests to an endpoint of the record set for the new resource.

At step 506, process 500 (e.g., using one or more components in system 300 (FIG. 3)) determines a network location of the additional resource. For example, the system may determine a network location of the additional resource. For example, a network location may be a profile that includes a collection of network and sharing settings that are applied to the network the system is connected to, including user settings, authorizations, additional resource access restrictions, data source availability, etc. Based on the network location assigned to the system's active network connection, features such as information retrieval, network discovery, etc., may be enabled or disabled.

At step 508, process 500 (e.g., using one or more components in system 300 (FIG. 3)) generates a network pathway to the additional resource. For example, the system may generate a network pathway (e.g., on the network associated with a data source of the monitored cloud-based database engine traffic) to the additional resource. For example, the system may generate one or more network pathways based on correlation-based network analysis combined with machine learning techniques. For example, the system may use machine learning (e.g., as described in FIG. 3 above) to select a path for traffic in a network or between or across multiple networks. The system may traverse and/or process information for numerous types of networks, including circuit-switched networks, such as the public switched telephone network (PSTN), and computer networks, such as the Internet.

The system may then automatically retrieve and/or integrate the additional resource from the network location (e.g., based on an update to a configuration file). For example, the system may automatically retrieve the additional resource from the network location in response to the recommendation and/or adjust weights related to different resources.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a similar manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method, the method comprising: monitoring incoming cloud-based database engine traffic over a plurality of disparate computer network resources; determining that a first resource of the plurality of disparate computer network resources that is processing the cloud-based database engine traffic corresponds to a first criterion; generating a first record corresponding to the first resource, wherein the first record comprises a first plurality of instances, and wherein each instance of the first plurality of instances corresponds to a respective instance where the first criterion was met; determining a first number of instances in the first plurality of instances; determining, using a model, a first dynamic threshold, wherein the first dynamic threshold corresponds to the first criterion, wherein the model is trained to determine a dynamic threshold number corresponding to criteria based on historical data patterns; determining a first difference between the first number of instances in the first plurality of instances and the first dynamic threshold number; and generating a first recommendation for domain name service based on the first difference, wherein the first recommendation requests a modification of an allocation of the plurality of disparate computer network resources.

2. The method of the preceding embodiment, wherein the method is for apportioning cloud-based resources based on real-time cloud-based database engine traffic patterns.

3. The method of any one of the preceding embodiments, further comprising: determining that a second resource of the plurality of disparate computer network resources that is processing the cloud-based database engine traffic corresponds to the first criterion; generating a second record corresponding to the second resource, wherein the second record comprises a second plurality of instances, and wherein each instance of the second plurality of instances corresponds to a respective instance where the first criterion was met; determining a second number of instances in the second plurality of instances; generating a composite number of instances based on the first number of instances and the second number of instances; determining a first composite dynamic threshold number; determining a composite difference between the composite number of instances and the first composite dynamic threshold number; and generating for display, on the user interface, a second recommendation based on the composite difference.

4. The method of any one of the preceding embodiments, further comprising: determining that a third resource of the plurality of disparate computer network resources that is processing the cloud-based database engine traffic corresponds to a third criterion; generating a third record corresponding to the third resource, wherein the third record comprises a third plurality of instances, and wherein each instance of the third plurality of instances corresponds to a respective instance where the third criterion was met; determining a third number of instances in the third plurality of instances; determining a third dynamic threshold number, wherein the third dynamic threshold corresponds to the third criterion, wherein the model is trained to determine a third dynamic threshold number corresponding to criteria based on historical data patterns; determining a third difference between the third number of instances in the third plurality of instances and the third dynamic threshold number; and generating for display, on a user interface, a third recommendation based on the third difference.

5. The method of any one of the preceding embodiments, wherein determining the first dynamic threshold comprises: determining an average number of instances in a historical record, wherein the average number of instances is based on historical data corresponding to the first criterion; and determining a probability range based on the average number of instances.

6. The method of any one of the preceding embodiments, wherein determining the first dynamic threshold comprises: determining one-time volume deviations based on rolling averages of cloud-based database engine traffic over time; and determining whether one or more of the one-time volume deviations are outliers based on parametric analysis.

7. The method of any one of the preceding embodiments, wherein determining the first dynamic threshold comprises: determining one-time volume deviations based on rolling averages of cloud-based database engine traffic over time; and determining whether one or more of the one-time volume deviations are outliers based on multivariate outlier detection.

8. The method of any one of the preceding embodiments, wherein the model is further trained to determine the dynamic threshold number corresponding to criteria based on historical user feedback indicating cloud-based database engine traffic linked to a given data owner.

9. The method of any one of the preceding embodiments, further comprising: determining additional resources corresponding to the recommendation; determining a network location of the additional resource; and generating a network pathway to the additional resource.

10. The method of any one of the preceding embodiments, further comprising: retrieving contact information for a data owner corresponding to the first resource; and transmitting the recommendation to the data owner.

11. The method of any one of the preceding embodiments, further comprising: determining a degree of deviation of data processing volume based on the difference; and selecting the recommendation from a plurality of recommendations based on the degree of deviation.

12. A tangible, non-transitory, machine-readable medium storing instructions that, when executed by a data processing apparatus, cause the data processing apparatus to perform operations comprising those of any of embodiments 1-11.

13. A system comprising: one or more processors and memory storing instructions that, when executed by the processors, cause the processors to effectuate operations comprising those of any of embodiments 1-11.

14. A system comprising means for performing any of embodiments 1-11.

What is claimed:

1. A system for apportioning cloud-based resources based on real-time cloud-based database engine traffic patterns, the system comprising:
storage circuitry configured to store a model, wherein the model is trained to determine a first dynamic threshold number;
control circuitry configured to:
monitor cloud-based database engine traffic over a plurality of disparate computer network read replicas;
determine that a first read replica of the plurality of disparate computer network read replicas that is processing the cloud-based database engine traffic corresponds to a first criterion of a first type;
generate a first record corresponding to the first read replica over a first time period, wherein the first record comprises a first plurality of instances, and wherein each instance of the first plurality of instances corresponds to a respective instance where the first criterion was met;
determine a first number of instances in the first plurality of instances;
determine, using the model, the first dynamic threshold number corresponding to the first criterion, wherein the model is trained to determine dynamic threshold numbers corresponding to criteria of the first type based on historical data patterns by determining an average number of instances, in the historical data patterns, corresponding to the criteria;
determine a first difference between the first number of instances in the first plurality of instances and the first dynamic threshold number;
determine that a second read replica of the plurality of disparate computer network read replicas that is processing the cloud-based database engine traffic corresponds to the first criterion;
generate a second record corresponding to the second read replica over the first time period, wherein the second record comprises a second plurality of instances, and wherein each instance of the second plurality of instances corresponds to a respective instance where the first criterion was met;
determine a second number of instances in the second plurality of instances;
generate a composite number of instances based on the first number of instances and the second number of instances;
determine a first composite dynamic threshold number; and determine a composite difference between the composite number of instances and the first composite dynamic threshold number; and input/output circuitry configured to generate a first recommendation for domain name service based on the first difference, wherein the first recommendation requests a modification of an allocation of the plurality of disparate computer network read replicas.

2. A method for apportioning cloud-based resources based on real-time cloud-based database engine traffic patterns, the method comprising:

monitoring cloud-based database engine traffic over a plurality of disparate computer network resources;

determining that a first resource of the plurality of disparate computer network resources that is processing the cloud-based database engine traffic corresponds to a first criterion of a first type;

generating a first record corresponding to the first resource, wherein the first record comprises a first plurality of instances, and wherein each instance of the first plurality of instances corresponds to a respective instance where the first criterion was met;

determining a first number of instances in the first plurality of instances;

determining, using a model, a first dynamic threshold number corresponding to the first criterion, wherein the model is trained to determine dynamic threshold numbers corresponding to criteria of the first type based on historical data patterns by determining an average number of instances, in the historical data patterns, corresponding to the criteria;

determining a first difference between the first number of instances in the first plurality of instances and the first dynamic threshold number; and generating a first recommendation based on the first difference, wherein the first recommendation requests a modification of an allocation of the plurality of disparate computer network resources.

3. The method of claim 2, further comprising:

determining that a second resource of the plurality of disparate computer network resources that is processing the cloud-based database engine traffic corresponds to the first criterion;

generating a second record corresponding to the second resource, wherein the second record comprises a second plurality of instances, and wherein each instance of the second plurality of instances corresponds to a respective instance where the first criterion was met;

determining a second number of instances in the second plurality of instances;

generating a composite number of instances based on the first number of instances and the second number of instances;

determining a first composite dynamic threshold number;

determining a composite difference between the composite number of instances and the first composite dynamic threshold number; and generating for display, on a user interface, a second recommendation based on the composite difference.

4. The method of claim 2, further comprising:

determining that a third resource of the plurality of disparate computer network resources that is processing the cloud-based database engine traffic corresponds to a third criterion;

generating a third record corresponding to the third resource, wherein the third record comprises a third plurality of instances, and wherein each instance of the third plurality of instances corresponds to a respective instance where the third criterion was met;

determining a third number of instances in the third plurality of instances;

determining a third dynamic threshold number, wherein the third dynamic threshold number corresponds to the third criterion;

determining a third difference between the third number of instances in the third plurality of instances and the third dynamic threshold number; and generating for display, on a user interface, a third recommendation based on the third difference.

5. The method of claim 2, wherein determining the first dynamic threshold number comprises:

determining one-time volume deviations based on rolling averages of the cloud-based database engine traffic over time; and determining whether one or more of the one-time volume deviations are outliers based on parametric analysis.

6. The method of claim 2, wherein determining the first dynamic threshold number comprises:

determining one-time volume deviations based on rolling averages of the cloud-based database engine traffic over time; and determining whether one or more of the one-time volume deviations are outliers based on multivariate outlier detection.

7. The method of claim 2, wherein the model is further trained to determine the first dynamic threshold number corresponding to the criteria based on historical user feedback indicating the cloud-based database engine traffic linked to a given data owner.

8. The method of claim 2, further comprising:

determining an additional resource corresponding to the first recommendation;

determining a network location of the additional resource; and generating a network pathway to the additional resource.

9. The method of claim 2, further comprising:

retrieving contact information for a data owner corresponding to the first resource; and transmitting the first recommendation to the data owner.

10. The method of claim 2, further comprising:

determining a degree of deviation of data processing volume based on the first difference; and selecting the first recommendation from a plurality of recommendations based on the degree of deviation.

11. A non-transitory, computer readable medium for comprising instructions that, when executed by one or more processors, cause operations comprising:

monitoring cloud-based database engine traffic over a plurality of disparate computer network resources;

determining that a first resource of the plurality of disparate computer network resources that is processing the cloud-based database engine traffic corresponds to a first criterion of a first type;

generating a first record corresponding to the first resource, wherein the first record comprises a first plurality of instances, and wherein each instance of the first plurality of instances corresponds to a respective instance where the first criterion was met;

determining a first number of instances in the first plurality of instances;

determining, using a model, a first dynamic threshold number corresponding to the first criterion, wherein the model is trained to determine dynamic threshold numbers corresponding to criteria of the first type based on historical data patterns by determining an average number of instances, in the historical data patterns, corresponding to the criteria;

determining a first difference between the first number of instances in the first plurality of instances and the first dynamic threshold number; and generating a first recommendation for domain name service based on the first difference, wherein the first recommendation requests a modification of an allocation of the plurality of disparate computer network resources.

12. The non-transitory, computer readable medium of claim 11, wherein the instructions further cause operations comprising:

determining that a second resource of the plurality of disparate computer network resources that is processing the cloud-based database engine traffic corresponds to the first criterion;

generating a second record corresponding to the second resource, wherein the second record comprises a second plurality of instances, and wherein each instance of the second plurality of instances corresponds to a respective instance where the first criterion was met;

determining a second number of instances in the second plurality of instances;

generating a composite number of instances based on the first number of instances and the second number of instances;

determining a first composite dynamic threshold number;

determining a composite difference between the composite number of instances and the first composite dynamic threshold number; and generating for display, on a user interface, a second recommendation based on the composite difference.

13. The non-transitory, computer readable medium of claim 11, wherein the instructions further cause operations comprising:

determining that a third resource of the plurality of disparate computer network resources that is processing the cloud-based database engine traffic corresponds to a third criterion;

generating a third record corresponding to the third resource, wherein the third record comprises a third plurality of instances, and wherein each instance of the third plurality of instances corresponds to a respective instance where the third criterion was met;

determining a third number of instances in the third plurality of instances;

determining a third dynamic threshold number, wherein the third dynamic threshold number corresponds to the third criterion;

determining a third difference between the third number of instances in the third plurality of instances and the third dynamic threshold number; and generating for display, on a user interface, a third recommendation based on the third difference.

14. The non-transitory, computer readable medium of claim 11, wherein determining the first dynamic threshold number comprises:

determining one-time volume deviations based on rolling averages of the cloud-based database engine traffic over time; and determining whether one or more of the one-time volume deviations are outliers based on parametric analysis.

15. The non-transitory, computer readable medium of claim 11, wherein determining the first dynamic threshold number comprises:

determining one-time volume deviations based on rolling averages of the cloud-based database engine traffic over time; and determining whether one or more of the one-time volume deviations are outliers based on multivariate outlier detection.

16. The non-transitory, computer readable medium of claim 11, wherein the model is further trained to determine the first dynamic threshold number corresponding to criteria based on historical user feedback indicating cloud-based database engine traffic linked to a given data owner.

17. The non-transitory, computer readable medium of claim 11, wherein the instructions further cause operations comprising:

determining an additional resource corresponding to the first recommendation;

determining a network location of the additional resource; and generating a network pathway to the additional resource.

18. The non-transitory, computer readable medium of claim 11, wherein the instructions further cause operations comprising:

determining a degree of deviation of data processing volume based on the first difference; and selecting the first recommendation from a plurality of recommendations based on the degree of deviation.

* * * * *